W. WAGNER, H. A. LOHR AND A. E. BOERNGEN.
VEGETABLE COOLER.
APPLICATION FILED MAR. 2, 1917.
1,318,034.
Patented Oct. 7, 1919.
2 SHEETS—SHEET 1.
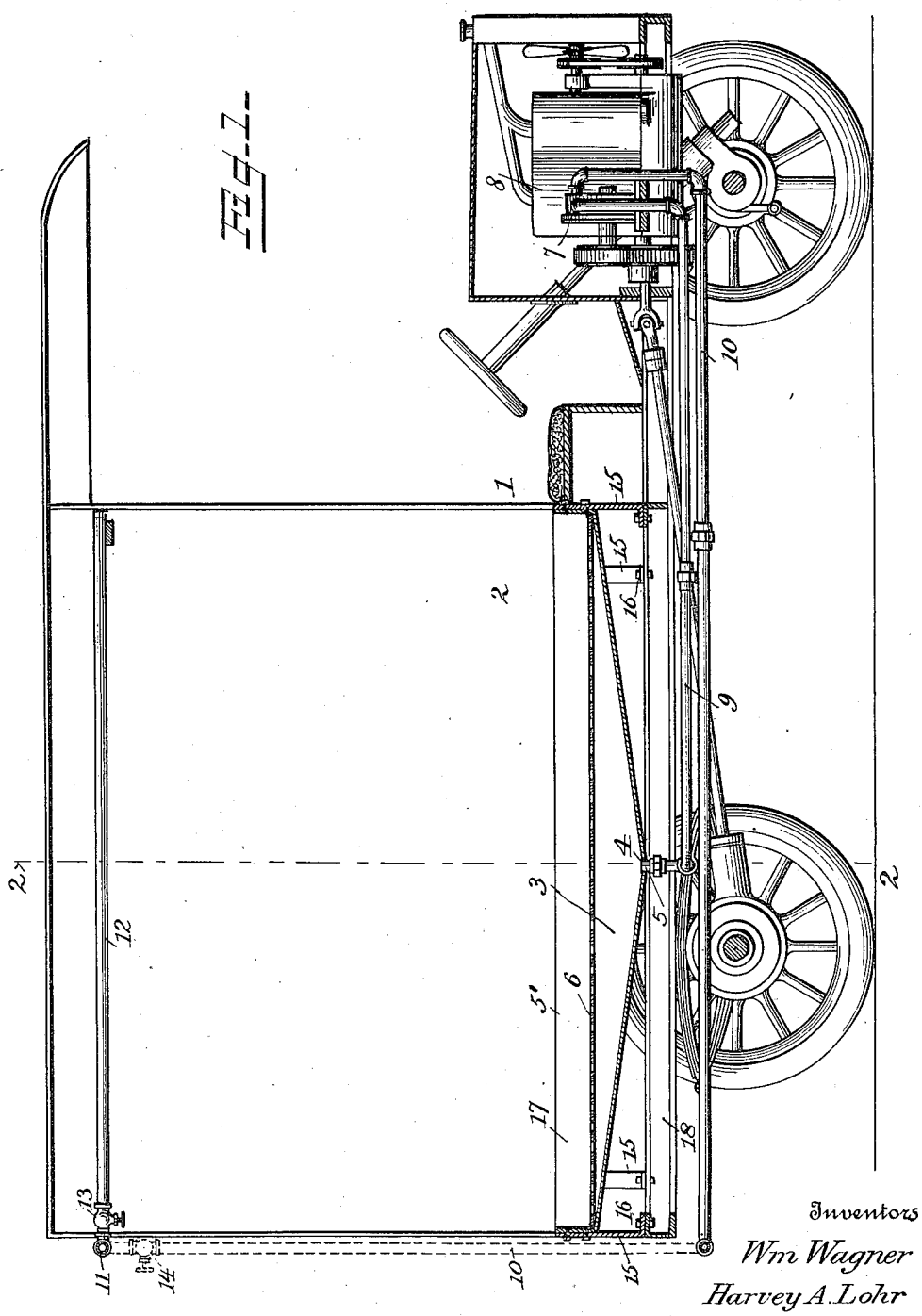
Inventors
Wm Wagner
Harvey A. Lohr
A. E. Boerngen
By
Runkle & Reinohl
Attorneys

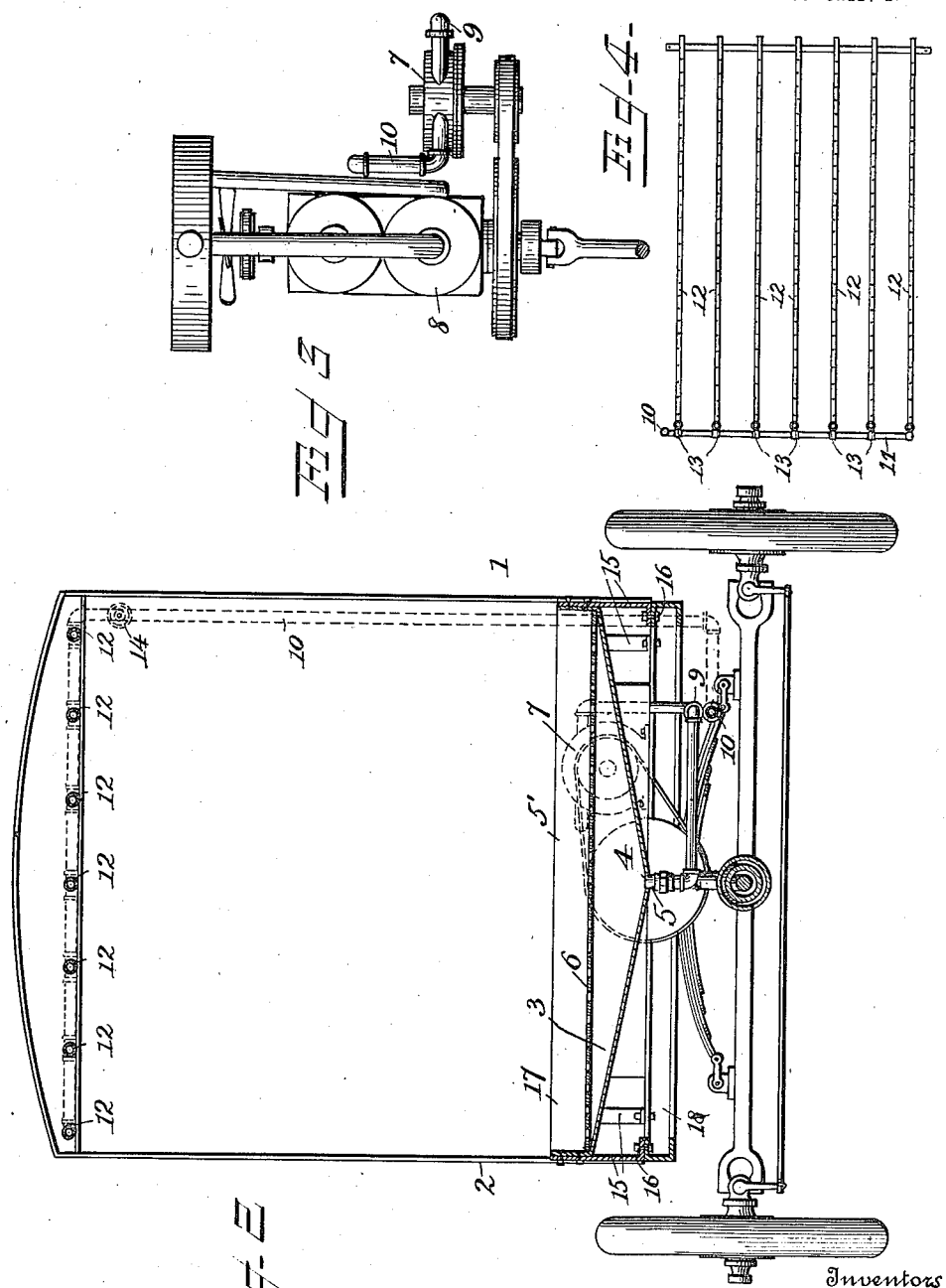

UNITED STATES PATENT OFFICE.

WILLIAM WAGNER, HARVEY A. LOHR, AND ALBERT E. BOERNGEN, OF MASSILLON, OHIO.

VEGETABLE-COOLER.

1,318,034. Specification of Letters Patent. Patented Oct. 7, 1919.

Application filed March 2, 1917. Serial No. 152,161.

*To all whom it may concern:*

Be it known that we, WILLIAM WAGNER, HARVEY A. LOHR, and ALBERT E. BOERNGEN, citizens of the United States, residing at Massillon, in the county of Stark and State of Ohio, have invented certain new and useful Improvements in Vegetable-Coolers, of which the following is a specification.

Our invention relates primarily to the art of cooling, has special reference to cooling and preserving farm or garden products such as vegetables and keeping them fresh while being transported from the grower or producer to the consumer, has for its object a cheap substitute for refrigerators and like devices used in the transportation of perishable products, and which may be readily converted into a vehicle for ordinary use.

The invention consists in certain features which will be hereinafter fully described and particularly pointed out in the claims.

In the accompanying drawings, which form part of this specification:—

Figure 1 is a vertical longitudinal section partly in side elevation of devices embodying our invention.

Fig. 2 is a vertical transverse section partly in elevation, on line 2—2, Fig. 1.

Fig. 3 is a top plan view of a conventional motor and a pump with suitable connections, and on an enlarged scale, and Fig. 4 is an inverted plan view of the sprinkler detached and on a reduced scale.

Reference being had to the drawings and the designating characters thereon, the numeral 1 indicates a vehicle, which may be an automobile as shown, or any other suitable form of vehicle, for the purpose. The automobile is used for the purpose of showing the adaptability of our invention thereto.

2 indicates the body of the vehicle, in which is placed a supply tank 3, whose bottom converges toward the center thereof and is provided with an outlet or discharge opening 4, to which is attached a nipple 5 extending through the bottom of the body of the vehicle. 6 indicates a removable perforated platform which may be made of any preferred material, such as iron or wood, to allow water to percolate through it and return to the supply tank 3, and is readily removable from the supply tank to afford access thereto for filling the same with pieces of ice and with water, and for keeping it in a sanitary condition.

7 indicates a pump driven by a suitable motor 8. The pump receives water from the supply tank 3 through a pipe 9 provided with suitable detachable connections, and discharges the water through pipe 10 connecting at its upper end with a pipe or manifold 11 which is provided with a series of horizontal perforated discharge branches 12, constituting a sprinkler. Each branch is provided with a valve or stop cock 13 for regulating the water discharged upon the vegetables or other perishable material; and in the pipe 10 is a valve 14 for turning on or shutting off the water supplied to the distributing branches 12.

The supply tank 3 may be supported on metal legs 15 secured thereto, which in turn may be detachably secured to the bottom of the body of the vehicle or to the chassis 18, of an automobile or truck by bolts 16; and the tank 3 may be provided with vertical flanges 17 to form sides and ends to prevent water wasting over.

It is obvious that the flanges may be made part of the tray instead of part of the supply tank.

Water from the supply tank 3 is kept in circulation through the pump and the sprinkler while the vehicle is in motion, and may be used when the vehicle is not in motion, by throwing the transmission gear out of connection.

The platform and the tank and all of the piping being detachably secured, may be easily and readily removed from the vehicle, and the pump disconnected from the motor, so that the vehicle can be used for other purposes when desired.

Having thus fully described our invention, what we claim is:

1. A portable drip-cooled green-grocer's cabinet comprising in combination a supply tank for a cooling medium having a bottom converging downwardly from its sides and ends, an overhead sprinkler, a pipe-line connecting said tank and sprinkler, a pump located in said pipe-line for circulating the cooling medium therethrough, and a removable perforated platform supported above the bottom of said supply tank.

2. A portable drip-cooled green-grocer's cabinet comprising in combination a supply tank for a cooling medium provided with upstanding flanges and a downwardly converging bottom, overhead sprinkling pipes, a pipe line connecting said tank and sprinkling pipes, a pump located in said pipe line for circulating the cooling medium therethrough, and a removable perforated platform supported between the flanges of said supply tank at a point above its converging bottom.

3. In a closed motor vehicle the combination with a supply tank for a cooling medium having a bottom converging centrally from all edges, an overhead sprinkler, a pipe-line connecting said tank and sprinkler, a pump located in said pipe-line for circulating the cooling medium therethrough and adapted to be operated by the vehicle motor and a removable, perforated platform superimposed with relation to the bottom of said supply tank.

In testimony whereof we affix our signatures in the presence of two witnesses.

WILLIAM WAGNER.
HARVEY A. LOHR.
ALBERT E. BOERNGEN.

Witnesses:
JOHN C. LOWE,
HENRY SUHR.